(12) United States Patent
Huber et al.

(10) Patent No.: US 6,820,099 B1
(45) Date of Patent: Nov. 16, 2004

(54) INSTANTANEOUS DATA UPDATING USING SNAPSHOT VOLUMES

(75) Inventors: Robin Huber, Wichita, KS (US); Donald R. Humlicek, Wichita, KS (US)

(73) Assignee: LSI Logic Corporation, Milpitas, CA (US)

(*) Notice: Subject to any disclaimer, the term of this patent is extended or adjusted under 35 U.S.C. 154(b) by 241 days.

(21) Appl. No.: 09/834,823

(22) Filed: Apr. 13, 2001

(51) Int. Cl.⁷ .............................................. G06F 17/30
(52) U.S. Cl. ................. 707/204; 707/2; 707/8; 707/9; 707/10; 707/103 R; 709/201
(58) Field of Search ................ 707/1, 2, 18, 201, 707/204, 100, 102, 200, 202, 203, 8, 9, 10, 103 R, 104.1, 205; 709/248, 101, 227, 230, 400, 201, 202, 203, 205, 209, 217, 223, 226, 247; 711/114, 162, 202; 715/500.1, 529; 705/7, 37, 38

(56) References Cited

U.S. PATENT DOCUMENTS 5,317,731 A * 5/1994 Dias et al. ..................... 707/8
6,131,148 A * 10/2000 West et al. ................. 711/162
6,473,775 B1 * 10/2002 Kusters et al. .............. 707/200
6,529,921 B1 * 3/2003 Berkowitz et al. ........ 715/500.1

* cited by examiner

Primary Examiner—Shahid Alam
Assistant Examiner—Fred Ehichioya
(74) Attorney, Agent, or Firm—Suiter West PC LLO

(57) ABSTRACT

In a computerized data storage system, when data is to be updated in a primary, or "base," logical volume, a snapshot volume is formed from the base volume. The updates are then made to the snapshot volume, preferably while the base volume is still used to satisfy normal I/O (input/output) access requests. After the updating is complete, the snapshot volume is rolled back into the base volume. During the rollback, any remaining original data in the base volume and the updated data in either the base volume or snapshot volume are available for satisfying the normal I/O access requests. Thus, the updating appears to be instantaneous, since the entire updated data is immediately available upon starting the rollback.

11 Claims, 3 Drawing Sheets

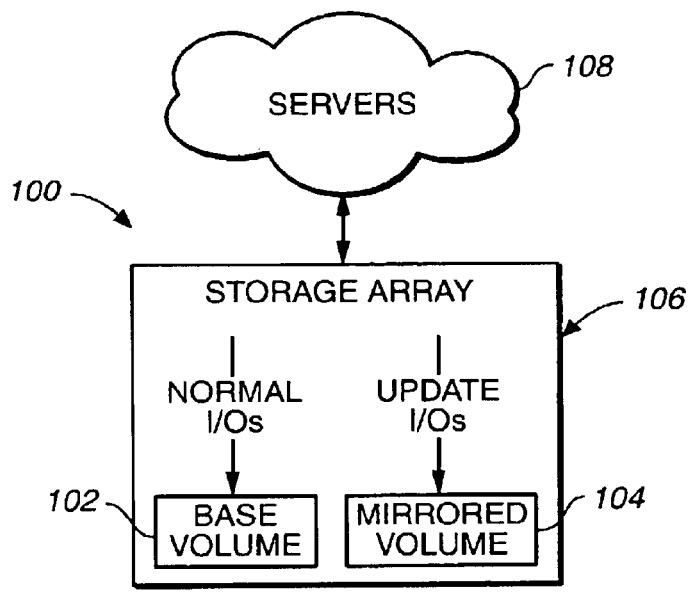
FIG._1 (PRIOR ART)
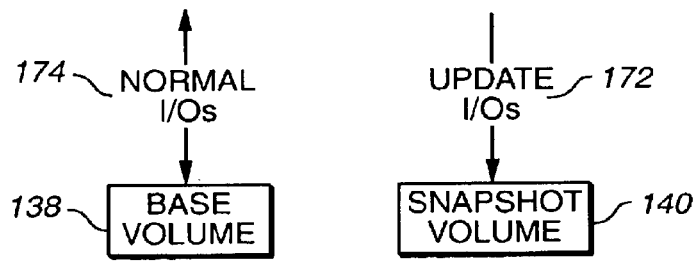
FIG._3
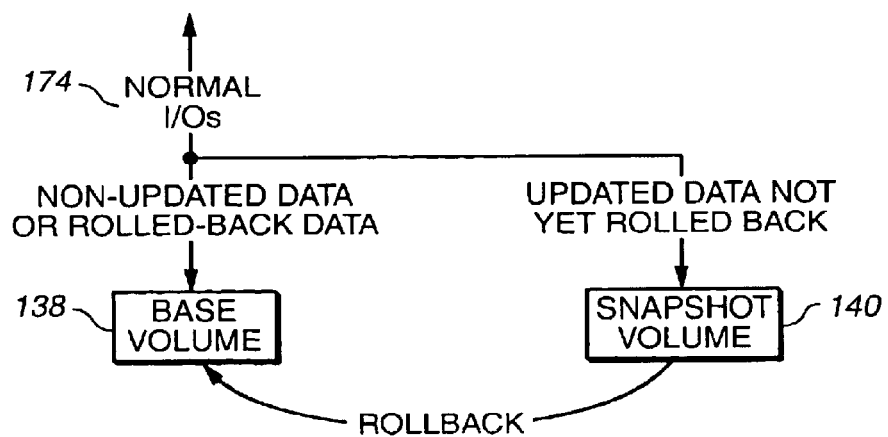
FIG._4

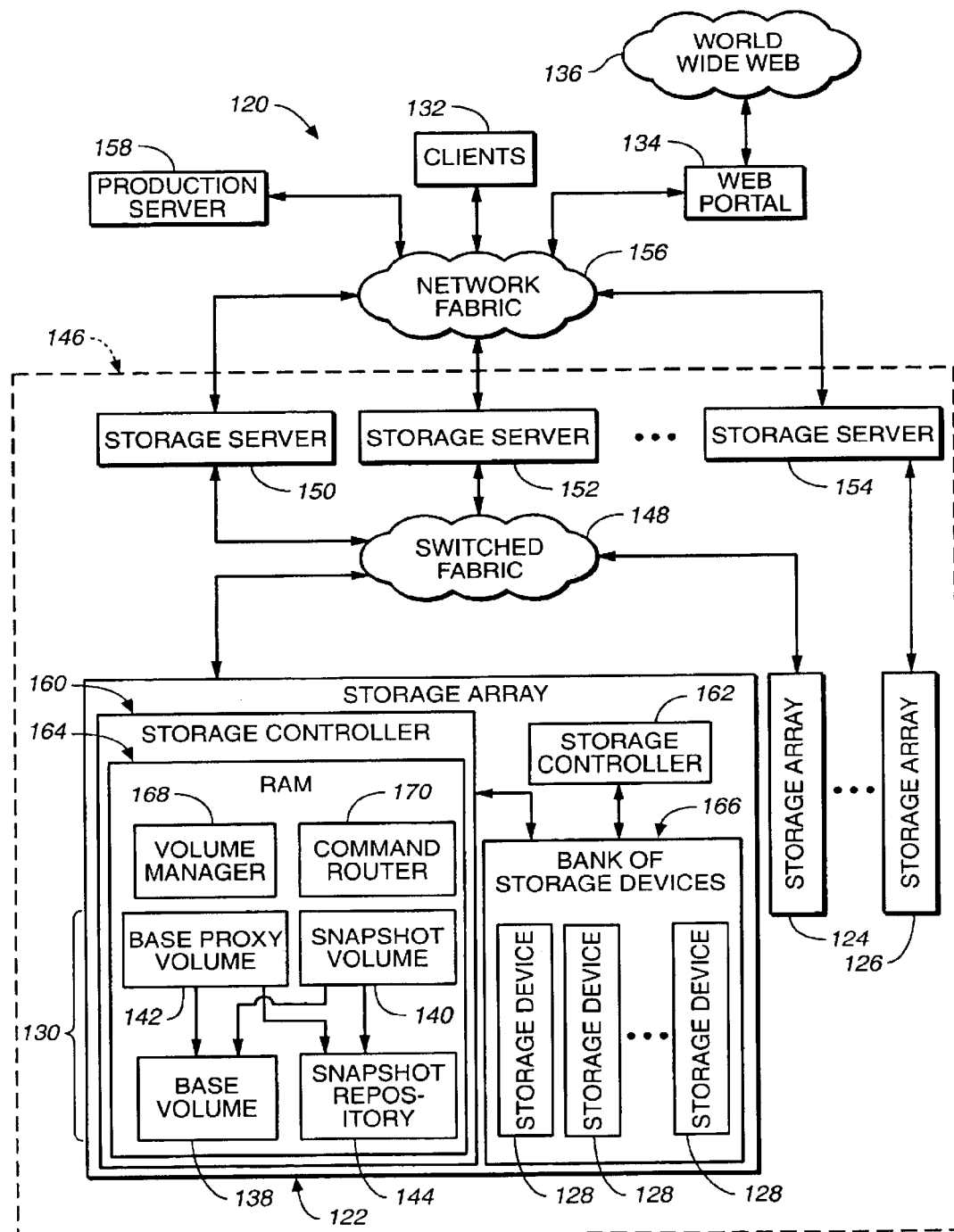
FIG._2

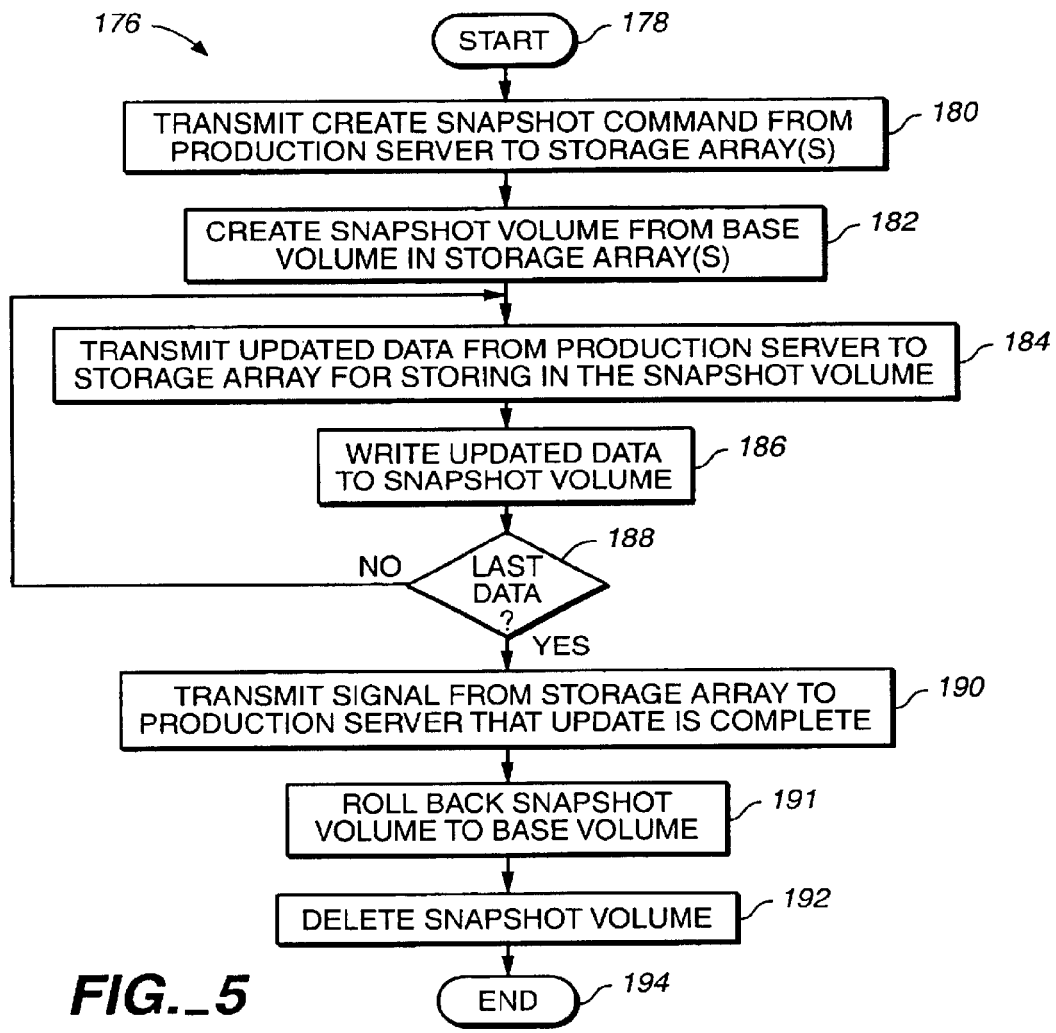
FIG._5
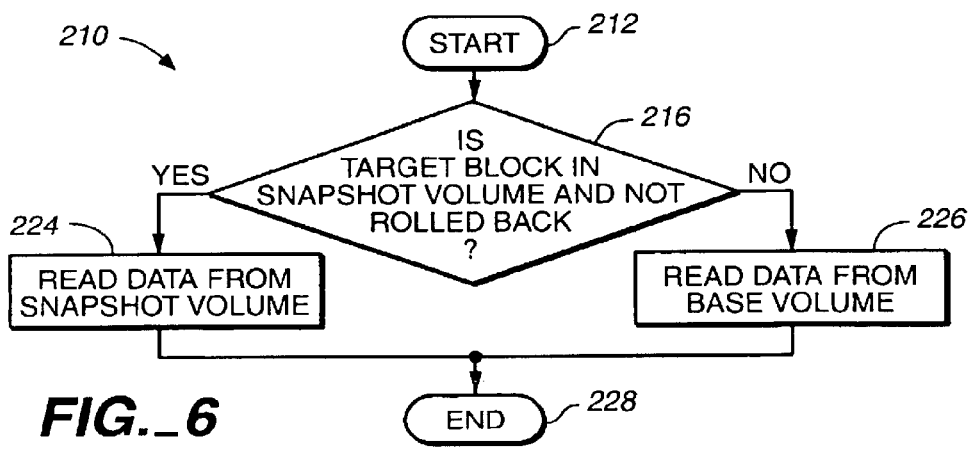
FIG._6

INSTANTANEOUS DATA UPDATING USING SNAPSHOT VOLUMES

CROSS-REFERENCE TO RELATED APPLICATIONS

This invention is related to an invention for Updating World Wide Web Pages in a Storage Area Network Environment, described in U.S. patent application Ser. No. 09/735,362, filed Dec. 11, 2000, and an invention for Managing a Snapshot Volume or One or More Checkpoint Volumes with Multiple Point-In-Time Images in a Single Repository, described in U.S. patent application Ser. No. 09/735,175, filed Dec. 11, 2000, and assigned to the same assignee as the present invention. The disclosures of these patent applications are incorporated herein by this reference.

FIELD OF THE INVENTION

This invention relates to apparatus and methods for data storage in a computerized network or system. More particularly, the present invention relates to instantaneously updating data on storage devices without interrupting use of the data.

BACKGROUND OF THE INVENTION

In a computerized data storage system, a common situation involves the use of relatively large files, volumes or databases that are accessed by a relatively large number of users within an enterprise or across the World Wide Web (the Web). For example, a computerized product sales system, an airline reservation system or a popular Web site, among others, requires a large database of information that must be current and immediately accessible by the users (e.g. salespeople, customers, etc.). It is not acceptable in such situations for the users to access incorrect or out-of-date information. Therefore, the data must occasionally be updated. (e.g. to account for price changes, flight schedule changes, Web page changes, etc.). However, it is also unacceptable for the users to access data that has been only partially updated, so the updates must appear to occur instantaneously.

One technique for performing "instantaneous" data updating is to use a volume mirroring process, as illustrated in the storage system 100 shown in FIG. 1. The data is copied from an original, or "base," volume 102 to a mirrored volume 104 in a different location in a storage array 106, or other storage device. The updates are made to the mirrored volume 104 while servers 108 continue to send normal I/O (input/output) access requests to the base volume 102 to be satisfied by the non-updated data. When the updating is complete, the servers 108 are redirected to the mirrored volume 104 to use as a new base volume for normal I/O's. Upon redirecting the servers 108 and the I/O's, the sudden redirecting makes it appear as if the data was updated instantaneously.

Another technique for performing instantaneous data updating uses a volume snapshot process. "Snapshots" are commonly used to quickly make a point-in-time image of the base volume so that the state of the data in the base volume at the time when the snapshot is formed can be preserved. Typically, data blocks in the base volume are not copied to the snapshot volume unless new data modifies or replaces the preexisting data blocks in the base volume. Unchanged data blocks stay in the base volume. Thus, the preexisting data for the entire base volume is preserved without having to make a complete copy of the base volume, as in the mirroring process. For performing the instantaneous data updating, the updates are made to the snapshot volume, while the base volume continues to receive normal I/O's from the connected servers. After the snapshot volume is updated, the servers are redirected to the snapshot volume.

Another technique for performing instantaneous data updating utilizing a snapshot volume is illustrated in the first aforementioned patent application. Generally, after the snapshot volume is formed from the base volume, the servers are redirected to the snapshot volume for normal I/O's. The updates are then made to the base volume, while the snapshot volume satisfies the I/O access requests. After the base volume is updated, the servers are redirected back to the base volume and the snapshot volume can be deleted.

Each of these techniques includes overhead and complexity that affects the efficiency of the instantaneous updating process. The technique that involves volume mirroring suffers from having to use a lot of additional storage space and using valuable processing time to make a complete copy of the base volume. All of the techniques require redirection of the server's I/O requests, which takes time to perform. In fact, the last of the techniques described above requires two redirections of the I/O requests.

It is with respect to these and other background considerations that the present invention has evolved.

SUMMARY OF THE INVENTION

The present invention utilizes snapshot techniques to quickly perform instantaneous data updating within a storage device, or storage array, without redirecting the servers, clients or other devices, that send the I/O access requests to the storage device. After forming the snapshot volume from the base volume, the updates are made to the snapshot volume, preferably while the base volume continues to respond to normal I/O access requests from the servers or clients. After the snapshot volume has been updated, a conventional "rollback" procedure is performed, which writes the data in the snapshot volume to the base volume.

The update to the base volume appears to be instantaneous because normal I/O access requests received during the rollback procedure are preferably satisfied from either the base volume or the snapshot volume, depending on which volume has the desired data. Thus, the rollback and the normal I/O access requests are processed concurrently. In this manner, the servers are never redirected, but are always sending the I/O access requests to the base volume. It is the base volume, a proxy for the base volume or other command routing software operating on the storage device, rather than the servers, that determines when to use the snapshot volume to satisfy the I/O access requests.

A more complete appreciation of the present invention and its scope, and the manner in which it achieves the above noted improvements, can be obtained by reference to the following detailed description of presently preferred embodiments of the invention taken in connection with the accompanying drawings, which are briefly summarized below, and the appended claims.

BRIEF DESCRIPTION OF THE DRAWINGS

FIG. 1 is a block diagram of a prior art storage system.

FIG. 2 is a block diagram of a storage system incorporating the present invention.

FIG. 3 is a flowchart showing the flow of data in the storage system shown in FIG. 2 while updating the data and responding to normal I/0 requests.

FIG. 4 is a flowchart showing the flow of data in the storage system shown in FIG. 2 while rolling back the data and responding to normal I/O requests.

FIG. 5 is a flowchart for a procedure to update data in the storage system shown in FIG. 2.

FIG. 6 is a flowchart of a procedure for responding to normal I/O requests while rolling back the data in the storage system shown in FIG. 2.

DETAILED DESCRIPTION

A storage system 120, as shown in FIG. 2, generally includes several conventional storage arrays 122, 124 and 126 of conventional storage devices 128. The storage arrays 122–126 generally contain several logical volumes 130 of data typically accessed via conventional I/O (input/output) access requests by conventional clients 132 or through a Web portal 134 by users of the World Wide Web 136 (the Web). The logical volumes 130 preferably include one or more base volumes 138 which contain the data accessed via the I/O access requests. When the data in the base volume 138 needs to be updated (e.g. to update prices in a product database, to update flight schedules for an airline, to update web pages of a web site for the Web, etc.), a snapshot volume 140, a base proxy volume 142 and a snapshot repository 144 are preferably formed from the base volume 138 as described in the second aforementioned patent application. The updated data is written to the snapshot volume 140, which stores data into the snapshot repository 144. After the updated data is written to the snapshot volume 140, the snapshot volume 140 is "rolled back" into the base volume 138 in a conventional "rollback" procedure, which writes the data contained in the snapshot repository 144 into the base volume 138, thereby updating the original data in base volume 138.

During the writing of the updated data to the snapshot volume 140, the normal I/O's received by the storage array 122–126 from the clients 132 or through the Web 136 are still satisfied by the base volume 138 from the original data contained therein. During the rollback procedure, the normal I/O's received by the storage array 122–126 are satisfied either by the base volume 138 from the original data contained therein or the updated data already written thereto or by the snapshot volume 140 from the updated data not yet written from the snapshot repository 144 to the base volume 138. In this manner, since the updated data is available through either the base volume 138 or the snapshot volume 140, the update to the base volume 138 appears to the clients 132 or users of the Web 136 as being instantaneous at the time that the rollback procedure begins.

After the rollback procedure completes, the normal I/O's are satisfied by the updated data and any remaining original data in the base volume 138. The snapshot volume 140, the base proxy volume 142 and the snapshot repository 144 are deleted if not needed for any other purpose.

The storage arrays 122–126 typically form a storage area network (SAN) 146 with a conventional switched fabric 148 (e.g. Fibre Channel) and one or more conventional storage servers 150, 152 and 154. The clients 132 or users of the Web 136 typically access the storage arrays 122–126 through the storage servers 150–154 and possibly through the switched fabric 148. One storage array 126 and one storage server 154, however, are shown connected directly to each other, instead of through the switched fabric 148, to illustrate an alternative configuration. A conventional network fabric 156 (such as an Ethernet network) commonly connects the clients 132 and the web portal 134 to the storage servers 150–154.

A production server 158 is typically used by an administrator of the storage system 120 to produce, or develop, the original data to be stored in the base volume 138, as well as the updated data to be used to update the original data in the base volume 138. Thus, it is typically the production server 158 through which the updating procedure is initiated when needed. The production server 158 connects to the storage system 120 at the network fabric 156 (as shown), the storage servers 150–154, the switched fabric 148 or directly to the storage arrays 122–126.

The storage arrays 122–126 typically include one or more conventional storage controllers 160 or 162, which control the functions of the storage arrays 122–126, including the accessing of the logical volumes 130, the creation and deletion of the different types of the logical volumes 130 and the updating of the data stored in the logical volumes 130, among other functions. The storage controllers 160 and 162 typically include a conventional main memory, or RAM, 164 in which the logical volumes 130 and other software operating in the storage arrays 122–126 reside. Backup copies of the logical volumes 130 also reside on the storage devices 128 arranged in a bank 166 of storage devices.

A volume manager 168 (a software program) resides in the RAM 164 and operates in the storage controllers 160 and 162 to create, delete and otherwise manage the logical volumes 130. A command router 170 (another software program) also resides in the RAM 164 and operates in the storage controllers 160 and 162 to route and manage the I/O access requests, including the normal I/O access requests directed to the base volume 138 and the update I/O access requests directed to the snapshot volume 140.

The flow of data for responding to the I/O access requests received while performing the data updating is shown in FIG. 3. After forming the snapshot volume 140 (and the base proxy volume 142 and the snapshot repository 144, FIG. 2) from the base volume 138, the update I/O access requests 172 are directed to the snapshot volume 140. The snapshot volume 140 stores the updated data in its snapshot repository 144. While the update I/O access requests 172 are being handled by the snapshot volume 140, the normal I/O access requests 174 are still being satisfied by the base volume 138. The data in the base volume 138 is preferably "read-only." Therefore, there is no risk of losing data written to the base volume 138 upon rolling back the snapshot volume 140 to the base volume 138. Alternatively, if it is desired to be able to write to the base volume 138, the normal I/O access requests 174 that write data to the base volume 138 may also be copied to the snapshot volume 140, if needed to preserve such changes to the base volume 138 after rolling back the snapshot volume 140 to the base volume 138.

The flow of data for responding to the normal I/O access requests 174 while performing the rollback from the snapshot volume 140 to the base volume 138 is shown in FIG. 4. The normal I/O access requests 174 that are directed to any remaining original non-updated data or updated data that has already been rolled back to the base volume 138 are satisfied by the base volume 138. The normal I/O access requests 174 that are directed to the updated data that has not yet been rolled back from the snapshot volume 140 are satisfied by the snapshot volume 140.

A procedure 176 for performing the data updating, preferably by the command router 170 (FIG. 2), is shown in FIG. 5. The updating procedure 176 starts at step 178. A command to create the snapshot volume 140 (FIG. 2) from the base volume 138 (FIG. 2) is transmitted (step 180), preferably from the production server 158 (FIG. 2), to the affected storage arrays 122–126 (FIG. 2). The snapshot volume 140 (and the base proxy volume 142 and the snapshot repository 144, FIG. 2 ) is then created (step 182) from the base volume 138 in the storage arrays 122–126.

The updated data is then transmitted (step 184), preferably from the production server 158 (FIG. 2), to the storage arrays 122–126 (FIG. 2) for storing in the snapshot volume 140 (FIGS. 2-3). The updated data is written (step 186) to the snapshot volume 140, which passes the updated data to its snapshot repository 144 (FIG. 2). If the updated data just written to the snapshot volume 140 at step 186 is not the last updated data, then the updating procedure 176 returns (step 188) to step 184 to transmit (step 184) and write (step 186) the next updated data.

Once the last updated data has been written to the snapshot volume 140 (FIG. 2), as determined at step 188, a signal is transmitted (step 190) from the storage arrays 122–126 (FIG. 2), preferably to the production server 158 (FIG. 2), indicating that the data updating is complete. The snapshot volume 140 is rolled back (step 191) to the base volume 138 (FIG. 2). The snapshot volume 140 (and the base proxy volume 142 and the snapshot repository 144, FIG. 2) is preferably deleted (step 192). The updating procedure 176 ends at step 194.

Since the data in the base volume 138. (FIGS. 24) is preferably read-only, the procedure for performing the normal I/O access requests 174 (FIG. 3) merely has to read data from the base volume 138. If it is desired to be able to write to the base volume 138 and copy the writes to the snapshot volume 140 (FIGS. 24), then the procedure for performing the normal I/O access requests 174 during the updating procedure 176 (FIG. 5) must duplicate the data write requests to the snapshot volume 140 and to the base volume 138.

A procedure 210 for performing the normal I/O access requests 174 (FIG. 4) during the rollback portion (step 191, FIG. 5) of the updating procedure 176 (FIG. 5) is shown in FIG. 6. The I/O procedure 210 starts at step 212. It is determined at step 216 whether the data block that is the target for the I/O access request 174 is in the snapshot volume 140 (FIGS. 24) and not yet rolled back to the base volume 138 (FIGS. 24). If so, then the data is read (step 224) from the snapshot volume 140. If the target data block is not in the snapshot volume 140 or has been rolled back to the base volume 138, as determined at step 216, then the data is read (step 226) from the base volume 138. The I/O procedure 210 ends at step 228. If it is desired to be able to write data to the base volume 138, then the procedure for performing the normal I/O access requests 174 generally follows the same steps as shown in the I/O procedure 210 for both the read data requests and the write data requests.

The present invention has the advantage of permitting updates to stored data without significantly adversely affecting the experience of users as the users access the data. The devices that issue normal I/O access requests never have to be redirected, so no delays are introduced by such redirections. Instead, the snapshotting, updating and rolling back procedures can be performed while the normal I/O access requests continue to be satisfied without interruptions. The updates appear to be instantaneous because the updated data is immediately available from either the snapshot repository (via the snapshot volume) or the base volume upon starting the rolling back. In this manner, the users experience an immediate transition from the original data to the updated data.

Presently preferred embodiments of the invention and its improvements have been described with a degree of particularity. This description has been made by way of preferred example. It should be understood that the scope of the present invention is defined by the following claims, and should not be unnecessarily limited by the detailed description of the preferred embodiments set forth above.

The invention claimed is:

1. A method for updating data contained in a base volume contained in a computerized data storage system connected to a production server on which the undated data is formed prior to writing the updated data to the snapshot volume, the updating appearing instantaneous to a user of the data, the base volume initially containing original data and finally containing updated data, comprising the steps of:

satisfying data access requests from the original data in the base volume;

forming the updated data on the production server;

transmitting a signal from the production server to the computerized data storage system instructing the computerized data storage system to perform the step of forming the snapshot volume;

transmitting the undated data from the production server to the computerized data storage system for writing to the snapshot volume;

forming a snapshot volume in a memory of a controller of the computerized data storage system of the original data in the base volume;

writing the updated data received from the production server to the snapshot volume;

after writing the updated data to the snapshot volume, transmitting a signal from the computerized data storage system to the production server indicating that the updating is complete;

rolling back the updated data from the snapshot volume to the base volume;

satisfying the data access requests from the updated data in the base volume and in the snapshot volume while rolling back the updated data from the snapshot volume to the base volume; and after rolling back the updated data from the snapshot volume to the base volume, deleting the snapshot volume.

2. A method as defined in claim 1, wherein the data access requests are directed to write new data to the base volume, comprising the further steps of:

writing the new data to the base volume;

before rolling back the updated data, writing the new data to the snapshot volume; and rolling back the updated data and the new data from the snapshot volume to the base volume.

3. A method as defined in claim 1 comprising the farther step of:

continuing to satisfy the data access requests from the original data in the base volume while writing the updated data to the snapshot volume.

4. A method as defined in claim 1 comprising the further step of:

while rolling back the updated data, receiving one of the data access requests directed to desired data;

determining whether the desired data is contained in the base volume;

if the desired data is determined to be contained in the base volume, satisfying the received data access request from the original data or the updated data in the base volume; and if the desired data is determined not to be contained in the base volume, satisfying the received data access request from the updated data in the snapshot volume.

5. A computerized data storage system connected to a production server, the computerized data storage system for responding to and satisfying received data access requests from data stored therein comprising:

a controller operative to control functions of the computerized data storage system;

a memory connected to the controller and containing the stored data;

a base volume contained in the memory, from which the received data access requests are satisfied under control of the controller, initially containing original data and finally containing updated data;

a production server upon which the updated data is formed before transmitting the updated data to the base volume;

a snapshot volume formed by the controller after receiving instructions from the production server to form the snapshot volume, the snapshot volume being formed from the base volume, contained in the memory, and into which the updated data is written under control of the controller;

and wherein the controller transmits a signal from the computerized data storage system to the production server indicating that the updating is complete;

and wherein the controller is operative to roll back the snapshot volume to the base volume after writing the updated data into the snapshot volume;

and wherein the controller is operative to satisfy the received data access requests from the base volume and the snapshot volume while rolling back the snapshot volume to the base volume;

and wherein the controller after rolling back the updated data from the snapshot volume to the base volume, deletes the snapshot volume.

6. A computerized data storage system as defined in claim 5 further comprising:

a storage unit containing the controller and the memory.

7. A computerized data storage system as defined in claim 5 wherein:

the data access requests are directed to write new data to the base volume;

is the controller is farther operative according to the received data access requests to write the new data to the base volume and to write the new data to the snapshot volume before rolling back the snapshot volume to the base volume.

8. A computerized data storage system as defined in claim 5 wherein:

the controller is further operative to continue to satisfy the received data access requests from the base volume while writing the updated data into the snapshot volume.

9. A computerized data storage system as defined in claim 5, wherein:

the controller is further operative, upon receiving one of the data access requests directed to desired data while rolling back the snapshot volume to the base volume, to determine whether the desired data is contained in the base volume, to satisfy the received data access request from the original data or the updated data in the base volume if the desired data is determined to be contained in the base volume, and to satisfy the received data access request from the updated data in the snapshot volume if the desired data is determined not to be contained in the base volume.

10. A method for updating data contained in a base volume contained, in a computerized data storage system connected to a production server, the updating appearing instantaneous to a user of the data, the base volume initially containing original data and finally containing updated data, comprising the steps of:

satisfying data access requests from the original data in the base volume;

forming the updated data on the production server;

transmitting a signal from the production server to the computerized data storage system instructing the computerized data storage system to perform the step of forming the snapshot volume;

transmitting the updated data from the production server to the computerized data storage system for writing to the snapshot volume;

forming a snapshot volume in a memory of a controller of the computerized data storage system of the original data in the base volume;

writing the updated data received from the production server to the snapshot volume;

after writing the updated data to the snapshot volume, transmitting a signal from the computerized data storage system to the production server indicating that the updating is complete;

receiving a write request wherein the write request data is written to the base volume and copied to the snapshot volume;

forming the snapshot volume to include the updated data and the write request data;

rolling back the updated data and write request data from the snapshot volume to the base volume;

satisfying the data access requests from the updated data and write request data in the base volume and in the snapshot volume while rolling back the updated data from the snapshot volume to the base volume; and after rolling back the updated data and write request data from the snapshot volume to the base volume, deleting the snapshot volume.

11. A method as defined in claim 10 comprising the further step of:

continuing to satisfy the data access requests from the original data in the base volume while writing the updated data to the snapshot volume.

* * * * *